March 17, 1953  C. C. ELLIOTT  2,631,976
SEPTIC TANKS
Filed July 2, 1949
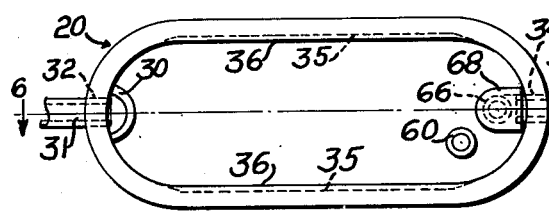
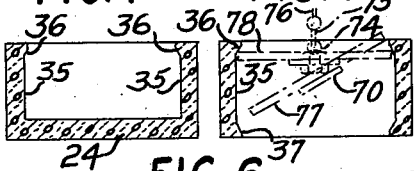
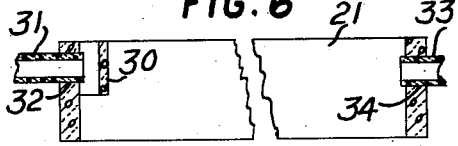
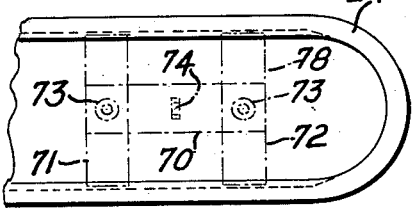
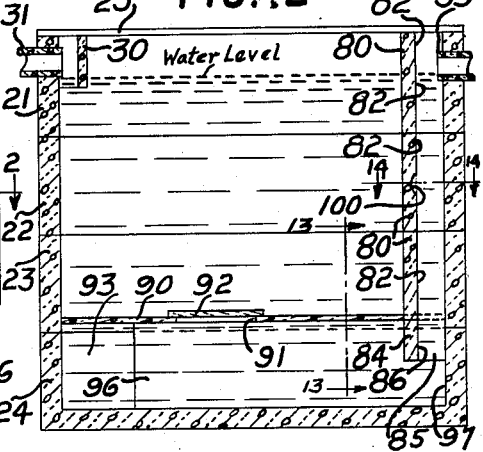
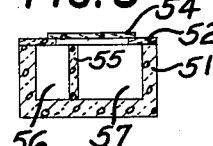
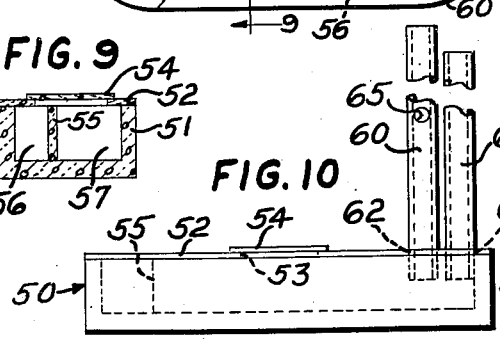
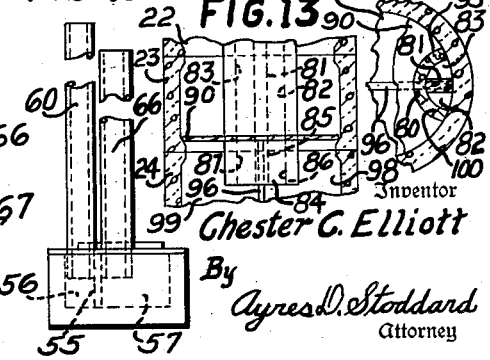
Inventor
Chester C. Elliott
By
Ayres D. Stoddard
Attorney Patented Mar. 17, 1953

2,631,976

UNITED STATES PATENT OFFICE 2,631,976

SEPTIC TANKS

Chester C. Elliott, Piqua, Ohio

Application July 2, 1949, Serial No. 102,861

9 Claims. (Cl. 210—6)

My invention relates to septic tanks having a novel purifying means contained therein, and particularly to a complete purifying chamber, which chamber is built into the bottom area of the tank. Moreover my novel purifying chamber is so constructed that it may be installed into septic tanks now in use, and is adapted for insertion into any shape of septic tank, whether it be cylindrical, square, rectangular, or any other shape or form.

There are many septic tanks now in use and it is a known fact that there is, in many instances, a considerable amount of sludge and scum passing out of the outlets of those tanks and deposited in the leach fields. Consequently the leach fields become clogged and the water does not properly drain through these fields as intended, the ultimate result being that the fields must be dug up and replaced with clean gravel or other types of leach field materials.

Therefore, it has been quite a problem to the users and also expensive. To solve this problem is the main object of my invention.

The best way to prevent such clogging of the leach fields is to provide a septic tank which gives substantially complete purification to the water and the waste material which is put into the tanks from toilets and drains of other types from homes which use septic tanks for sewage and drainage disposal.

I have invented a septic tank water purification means whereby substantially all of the sludge and scum is retained in the tank, and the tank outlet, therefore, emits only a substantially pure water which greatly lengthens the life and use of the leach fields.

In many septic tanks now in use the sewage enters near the top and roils the water and consequently that roiled water, when it leaves the tank carries with it a considerable amount of sludge and scum, which is deposited in the leach field.

To overcome the above bad condition I have invented a novel means to cause the water which leaves the tank to be substantially free from sludge and scum. To accomplish this I provide means to force the water in the tank, downwardly into a purifying chamber or compartment which is sealed off from the water in the upper part or compartment of the tank.

I also arrange such means so that the water which is forced down, is taken from that area of the water in the upper chamber or compartment which is approximately half way between the scum area and the sludge which is deposited on the bottom of said upper chamber.

Therefore the water which is forced down from the upper chamber into the lower chamber comes from the clearest and purest area of the water in said upper chamber.

After the water reaches the lower chamber it is circulated around a baffle plate in said lower chamber into what I term as the outlet section of my lower chamber. As the water is circulated from the inlet side of the lower chamber and around the baffle plate, whatever sludge is in this water is deposited on the bottom of both, the inlet section and the outlet section of the lower chamber and the scum forming material rises to the top of said sections of the lower chamber.

The outlet section of the lower chamber is connected to the outlet pipe near the top of the upper chamber by a conduit which extends downwardly from said outlet pipe, through the top of the lower chamber. The bottom of this conduit is approximately half way between the top and the bottom of said lower chamber and therefore the water from that area between the scum and the sludge is the water which is forced up said conduit to the outlet pipe and thence to the leach field.

Thus my novel means forces the taking of the water out of the section of the septic tank which section is entirely sealed off from and independent of the section of the tank into which all sludge is initially deposited, except for the circulating conduit connecting the upper chamber and the lower section or chamber as above mentioned.

This novel construction and combination of elements causes a very slow and quiet circulation of water in the lower section or chamber which enhances the rising of scum and the depositing or settling of sludge, thus materially aiding in the purification of the water in the lower or purifying chamber.

Most of the sludge is deposited in the upper chamber and most of the scum also rises to the top of the upper chamber. However some of the sludge will pass through the inlet conduit from the upper chamber and into the lower section, but, as above mentioned, the water in this lower section is not stirred or roiled up and consequently the quietness of the water in said lower section causes the sludge therein to settle and the scum to rise to the top of this section whereby the water being taken out of this section from the area between the sludge deposit and the scum, is substantially free from sludge and scum as it is deposited into the leach field.

In other words, with my novel septic tank having the purifying chamber in operation the impurities in the water emitted from the tank are reduced to a minimum.

It is, therefore, the main object of my invention to provide a water purification means for septic tanks.

It is another object of my invention to provide a water purification means for septic tanks, to direct the flow of water therein whereby the sludge and scum is prevented from being emitted from the tank through the outlet drain.

Another object of my invention is to provide a novel septic tank having a plurality of chambers or compartments sealed from each other and having means to force the water to circulate in a definite channel after entering the top chamber near the top thereof, said channel causing the water to be forced downwardly into another chamber near the end thereof and through one section of the latter chamber, around the end of a baffle in said latter chamber, through another section of the latter chamber and thence upwardly through a conduit to the outlet pipe near the top of the chamber from whence it flows to the leach field.

A further object is to provide a novel water purifying chamber adapted to be installed into septic tanks now in use, said purifying chamber being sealed and having an inlet conduit whereby water from above the chamber enters said chamber, the latter also having an outlet conduit adapted to be connected to the regular septic tank outlet pipe near the top thereof.

A still further object is to provide a water purifying chamber as above mentioned to cause the water, when the chamber is inserted into a septic tank, to flow from that area of the septic tank above the inserted chamber, and from the area of water between the sludge deposit on the top of said inserted chamber and the scum area at the top of the water above said chamber, through a pipe or conduit having an opening in the side thereof, downwardly into said purifying chamber, through a conduit to the tank outlet pipe near the top of the tank.

Another object is to arrange the outlet conduit of the purifying chamber so that the water flowing from said chamber is taken from an area above any sludge deposited in the chamber on the bottom thereof, and from below any scum which has risen in said chamber and consequently is up against the underside of the chamber lid or top.

Still another object is to provide said chamber of the type mentioned with a dividing plate or baffle, which forms two separate sections in the chamber, which sections are joined at one end of the chamber only, thus causing the water which enters the chamber near one end thereof and on one side of the baffle, to be circulated through that section of the chamber, around the end of the baffle and through the other section of the chamber before said water can be emitted from or flow out of the purifying chamber.

Another object of my invention is to provide a novel water purification means which can be inserted into septic tanks now in use so as to prevent clogging of the leach fields from the septic tank drainage.

A further object is to provide a water purifying means for septic tanks, comprising a chamber formed by closing off the bottom section of the tank and having a baffle plate extending from the bottom of the tank to the underside of the chamber top and extending substantially eighty per cent (80%) of the length of the chamber from one end thereof, and having an inlet in the chamber top on one side of the baffle and near the closed end of the chamber to cause the water to flow into one section of the chamber at the closed end thereof and be directed through said section of the chamber to the open end, around the free end of the baffle and through the other section of the chamber to an outlet near the closed end of the chamber, the closed end of the chamber being the end where the baffle plate is against the vertical wall of the chamber.

A still further object of my invention is to provide a purifying chamber for septic tanks, which chamber may be inserted into tanks now in use without any change in said tanks except to connect the outlet with an outlet conduit or pipe which is connected to said chamber.

Another object of my invention is to produce a novel purifying chamber for septic tanks, said purifying chamber being adapted for insertion into septic tanks now in use, and having a novel water circulating means to cause the water to circulate very slowly all through the purifying chamber, thus aiding the sludge deposit which causes much purer water to be drained into the leach fields.

With these and other incidental objects in view my invention includes certain novel features and combinations of parts, the essential elements of which are set forth in appended claims, and a preferred and modified forms of which are hereinafter described with reference to the drawings which accompany and form a part of this specification.

In said drawings:

Fig. 1 is a top plan view of my preferred form of septic tank with the lid or cover removed, and showing the inlet and outlet conduits of my purifying chamber.

Fig. 2 is a section on line 2—2 of Fig. 3, looking in the direction of the arrows, and shows the bottom section of my tank with the purifying chamber therein.

Fig. 3 is a side elevation of my septic tank.

Fig. 4 is a cross section through the center of the bottom section of my tank.

Fig. 5 is a cross section through the other sections of my tank, and shows, in dot-and-dash lines, a means for handling the tank sections when installing and assembling a tank in the pit.

Fig. 6 is a longitudinal section through the top section of my tank.

Fig. 7 shows a part of the bottom section and also shows, in dot-and-dash lines the lowering means in position.

Fig. 8 is a top plan view of the assembled purifying chamber.

Fig. 9 is a section of line 9—9 of Fig. 8 looking in the direction of the arrows.

Fig. 10 is a side elevation of the assembled purifying chamber.

Fig. 11 is an end elevation of the same.

Fig. 12 is a sectional view of the tank illustrating how the purifying chamber may be built into the tank, and also shows the inlet and outlet conduits.

Fig. 13 is a section on line 13—13 of Fig. 12, looking in the direction of the arrows.

Fig. 14 is a section on line 14—14 of Fig. 12, looking in the direction of the arrows, and shows the inlet and outlet conduits, a portion of the chamber forming cover, a portion of the chamber baffle and a portion of the tank bottom.

General description

My septic tanks are preferably made in sections which are assembled one above the other and are specially constructed so as to be easily handled and set in position when asembling the complete tank. However, my tanks may be made in a single unit if desired.

A novel purifying chamber is located in the lower section of the tank, when the tank is built in sections, such chamber being in the lower area of a tank which is built in a single unit. My chamber is also built in a separate unit ready to be inserted into a tank that is already in use. The shape of the chamber depending upon the shape of the tank into which it is to be installed.

The purifying chamber is constructed with a box-like member with a lid and a fin or baffle in the box member, which baffle extends from the bottom of the box to the under side of the lid when the latter is placed on the box. The baffle extends from one vertical end wall of the box a distance of about eighty per cent (80%) of the length of the box to cause the flow of water in the purifying chamber to be directed in a certain path from a water circulating conduit, through the lid on one side of the baffle to an outlet conduit at the same end of the chamber but on the other side of the baffle from the water circulating conduit.

While I have shown a substantially rectangular tank with rounded ends built up in sections, my tank may be made in other shapes such as cylindrical and it may be built or cast in a single unit or piece and the purifying chamber formed in the bottom by means of a baffle and lid to form such chamber.

In either event the purifying chamber is sealed off from the rest of the tank so that no water enters the purifying chamber except through the water circulating conduit inlet to said chamber, such conduit having an inlet hole substantially half way between the normal water line in the full tank, and the top of the purifying chamber. This being the area in which the water is the clearest and purest, due to the fact that the gases formed in the sludge as it falls or settles, which gases are caused by bacteria action, said gases cause some of the sludge to rise and form a scum on the top of the water in the tank.

As shown in the drawings the purifying chamber is made in a single unit, all sealed and ready to be inserted into any tank now in use regardless of the shape or size of such tank.

In my novel septic tank the sludge is deposited on the lid which forms the purifying chamber, and the other impurities rise and form a scum on top of the water level near the top of the tank as previously mentioned, due to the bacteria action.

The inlet into the water circulating conduit is arranged below the scum area and above the sludge deposit so that a comparatively small amount of scum forming impurities enters this circulating conduit, but such small amount of scum forming impurities rise in the purifying chamber and are therefore kept against the underside of the chamber lid, and any sludge is deposited on the bottom of the chamber.

This water circulating conduit enters the purifying chamber through the lid thereof near the outlet end of the chamber and on one side of the baffle into the inlet section of the chamber and thus causes the water to circulate from one end of the inlet or intake section of the purifying chamber, through that section of the chamber, around the end of the baffle, through the outlet section of the chamber to an outlet conduit which is provided to connect the end of the outlet section of the purifying chamber with the outlet pipe near the top of the tank, which pipe runs to the leach field.

This construction causes a long slow movement of water through the purifying chamber, and around the baffle, and since the bottom of the outlet conduit is below the scum area and above the sludge area in the purifying chamber, the water which passes upwardly from said chamber to the outlet pipe is substantially free from sludge and scum forming impurities.

Thus the sludge and scum passing from the outlet pipe into the leach field is reduced to the very minimum. That is, the percentage of sludge and scum drained into the leach field is far below that which is deposited by septic tanks without my novel purifying chamber. Consequently the life of said leach field is increased many fold.

Detailed description

My novel septic tank 20 may be made, as stated above, in one piece, but I prefer to make it in sections. Therefore I have shown a four section tank having a top section 21, two middle sections 22 and 23 and a bottom section 24. My tank is sealed with a cover plate 25 shown in Fig. 3.

The sections 21, 22, 23 and 24 are sealed, as they are assembled, at their junctures to form a water tight tank. The several sections of the tank are preferably made of reinforced concrete or material of such nature and they are preferably sealed with mortar.

The top section 21 has formed in one end an inlet conduit 30 into which projects the end of an inlet pipe 31 which extends through a hole 32 in the end wall of the top section 21. The opposite end of the top section 21 has an outlet 33 which projects through a hole 34. Said pipe 33 runs to the leach field.

The sides of the top section 21, the middle sections 22 and 23 and the bottom section 24 are recessed at 35 (Figs. 1, 2, 4 and 5) and form angular lips 36 to facilitate handling and the lowering of the sections into assembling position, when lowered into the tank pit.

The recesses 35 in the sections 21, 22, 23 form lips 37 along the bottom of the side wall sections, thus the tops and the bottoms of all sections are of the same width and match when assembled as shown in Fig. 13.

My purifying chamber 50 comprises a reinforced concrete receptacle or box 51 having a lid 52 with a clean-out hole 53 covered with a removable slab 54. A vertical baffle 55 rests on the inside of the bottom of the box 51 and extends upwardly, flush with the top of the box side walls so that when the lid 52 is on the box it contacts the top of the baffle 55. This baffle 55 extends from a point about one-fifth of the distance of the length of the inside of the chamber 50 until it contacts the opposite end wall of said insertable purifying chamber thus forming an intake section 56 and an outlet section 57 (Figs. 2, 8 and 9).

A water circulating conduit 60 (Figs. 1, 2, 8, 10 and 11) extends through a tapered hole 62 in the chamber lid 52 into the intake section 56 of the chamber 50 adjacent the closed end of this section 56 and extends substantially half way to the bottom of said chamber section 56. The conduit 60 is tapered to fit the tapered hole 62 and such construction maintains the conduit in its proper position relative to the bottom of the chamber intake section 56. The conduit also extends upwardly above the water line (Fig. 3) to a point just below the cover plate 25.

Approximately half way below said water line, which is also below the scum area, and the top of the chamber 50, the water circulating conduit 60 has an inlet opening 65 in the side thereof. A water circulating outlet conduit 66 extends through a tapered hole 67 (Figs. 1, 2, 3, 8, 10 and 11) of the chamber lid 52 into an outlet section 57 of the chamber 50 adjacent the closed end of this section 57 and extends substantially half way to the bottom of said chamber section 57. This conduit 66 is tapered to fit the hole 67 and such construction maintains the conduit 66 in its proper position relative to the bottom of the outlet section 57. An elbow 68 (Figs. 1 and 3) connects the top of the conduit 66 with the outlet pipe 33 to form a continuous channel for the flow of water from the chamber section 57 to the outlet pipe 33.

The conduits 60 and 66 may each be made in one piece as shown or they may be built up in sections of cement, tile or any other cementitious material fitted for the use here described.

After my tank 20 is completely installed with my novel purifying tank or chamber therein and filled with water it is then ready to function. The water line is maintained just below the inlet pipe 31 and at the inside of the bottom of the outlet pipe 33.

The drainage from a house enters through the inlet pipe 31 into the conduit 30. The sludge forming material settles and is deposited on the top of the lid 52 of the chamber 50 and also in the bottom of the tank section 24 in the clearance area around the chamber 50. This clearance area is designated 69 and is shown in Figs. 2 and 3.

Due to bacteria action, as previously mentioned, the scum forming material rises to the top of the water in the tank 20 as scum. When drainage enters the tank 20 as above mentioned a slow circulation of water is created through the opening 65 in the water circulating conduit 60, through the inlet or intake section 56 of the purifying chamber 50, around the end of the baffle 55, through the outlet section 57 of said chamber 50, and thence upwardly through the outlet conduit 66 and elbow 68 and into the outlet pipe 33.

Since the inlet hole 65 of the conduit 60 is located below the scum area and above the sludge area the water which enters the hole 65 and is circulated as above described, has been rid of a very high percentage of sludge forming matter and scum forming matter.

However to clear the water from further material defilement is the main purpose and object of my invention, and as the water is circulated through the two sections 56 and 57 of my purifying chamber 50, substantially all of the material defilement is deposited as sludge on the bottom of said chamber 50 and also any scum forming material rises and remains against the underside of the lid 52.

Such deposit of sludge and scum in the purifying chamber 50 is greatly enhanced by the very slow circulating movement of water in the chamber 50. In this chamber 50 the water does not become roiled up as it does in the upper chamber of the tank 20 due to the location of the inlet hole 65 being under water and also due to the fact that the chamber 50 is always completely filled with water.

Therefore, the water which is circulated up through the outlet conduit 66 to the outlet pipe 33, to be deposited in the leach field, is practically free from material defilement, such as sludge and scum forming matter.

Therefore, the tank drainage water being in such a condition due to the substantial purification thereof by means of my novel purifying chamber and water circulation control, causes a very much longer life of the leach field, and, consequently greatly lessens the cost of maintenance of the leach fields.

In Figs. 5 and 7 I have shown one means by which the bottom section 24 may be easily lowered into a septic tank pit and the other sections 21, 22 and 23 lowered into position to be assembled into the complete tank 20. I assemble three bars or planks 70, 71 and 72 with bolts 73. The plank 70 is on the bottom of the planks 71 and 72. An eye bolt 74 is secured to the center of the plank 70 to receive a hook 75 attached to a derrick or crane cable 76. The assembled planks 70, 71 and 72 are tipped at an angle such as shown at 77 in Fig. 5 and inserted into the sections 21, 22, 23 and 24 until they assume the position shown at 78 in Figs. 5 and 7. They are then raised by the cable 76 until the ends of the planks 71 and 72 engage the lips 36, after which the entire section may be raised, due to the fact that said planks are longer than the width of the opening between the top edges of the two lips 36. The bottom section 24 is then swung into position over a tank pit and then lowered into the pit. The two middle sections are then lowered into position, one at a time, to be assembled and sealed to form the complete water tight tank 20.

As mentioned above my novel purifying chamber 50 and the parts incident thereto to cause it to function may be installed in septic tanks already in use, and in such cases the chamber 50 is made to conform with the inside of the tank, whether it be round, square, rectangular or any other shape, allowing for clearance for insertion into such tank which is in use.

The baffle plate 55 is made accordingly to provide an intake section 56 and an outlet section 57 of the purifying chamber 50. A water circulating conduit 60 is used and an outlet conduit 66 is used and is connected to the tank outlet pipe 33.

*Modified form*

In Figs. 12, 13 and 14 I have shown a modified form wherein I build my purifying chamber in the bottom of the tank and build my water circulating conduits accordingly. In these figures wherever the parts are like those previously described they bear identical reference numbers.

This septic tank 20 is built with a top section 21, middle sections 22 and 23 and a bottom section 24. This tank is sealed with a cover plate 25. The sections 21, 22, 23 and 24 are cemented at their junctures to form a water tight tank.

The top section 21 has an inlet pipe 31, a short conduit 30 and an outlet pipe 33. The sections 21, 22 and 23 each have a baffle 80 with a vertical plate 81 therein to form a water circulating inlet channel 82 and a water circulating outlet channel 83. The three baffles 80 and the three plates 81 are in alignment and consequently the three channels 82 and 83 are in vertical alignment with each other, respectively.

The bottom section 24 has a baffle 84 with a plate 85 forming an inlet channel 86 and an outlet channel 87. This baffle 84, plate 85 and channels 86 and 87 are in alignment with baffles 80, plates 81 and channels 82 and 83, respectively.

The sections 21, 22, 23 and 24 all have recesses 35 forming lips 36 and 37. Resting on the lips 37 of the section 23 is a plate 90 having an opening 91 covered by a removable slab 92 for cleanout purposes. The plate 90 is grouted or cemented in this position thus forming a purifying chamber 93. The plate 90 is notched at 95 to fit around the lower part of the baffle 80.

A baffle plate 96 extends from the bottom of the chamber 93 to the underside of the plate 90 from about one-fifth of the distance of the length of the bottom section until it contacts the end wall 97 of the section 24. Said plate 96 is formed to fit down the side of the baffle 84 and the underside of the plate 85. Therefore this plate 96 forms an intake section 98 and an outlet section 99 in the chamber 93.

An inlet hole 100 is provided in the baffle 80 in the section 22 to connect the inlet channel 82 with the upper chamber in the tank 20.

In this form of tank the water circulates from the upper chamber between the sludge deposit on the top of the plate 90 and the scum area on the water level, through the hole 100, down the channel 82—86 into the intake section 98, around the end of the baffle 96, through the outlet section 99 of the chamber 93, up through the channel 87—83 to the outlet pipe 33.

Therefore the water leaving this tank 20 shown in Figs. 12, 13 and 14 is substantially free from material defilement for the reasons pointed out in connection with the description of my preferred form of septic tank described earlier herein.

While the forms of tanks which I have illustrated and described are admirably adapted to fulfill all of the objects primarily stated, it is to be understood that I do not intend to limit or confine my invention to the two forms shown and described, for it is susceptible of embodiment in various forms, such as cylindrical, round or rectangular in shape, and it may be made, as previously pointed out, in a single unit in lieu of the four sections shown, and furthermore my novel purifying chamber is susceptible of being installed and used in septic tanks which have no purifying chamber and which are now in use.

What I claim is:

1. A closed chamber adapted to be inserted into a septic tank in the lower area of said tank, said tank having an inlet and an outlet pipe adjacent the top thereof; said chamber having means including a plurality of conduits and a baffle plate to compel the water in the tank to be circulated from an area below the water line in the tank, downwardly into one end of said chamber, through said chamber from one end to the other end thereof and back to another area of said one end, and thence upwardly directly to said outlet pipe.

2. A closed chamber adapted to be inserted into a septic tank in the lower area thereof, said septic tank having an inlet pipe and an outlet pipe adjacent the top thereof; means extending into said chamber and having an opening in the side thereof to create a circulation of water above said chamber and from an intermediate area thereof and into one end area of said chamber; a member in said chamber to cause the water entering therein to circulate from said one end area to the other end of said chamber and around one end of said member back to the said one end of the chamber but in a different area in said one end; and a conduit extending into said different area of the chamber and also extending upwardly to said tank outlet pipe to cause the water circulated in the chamber to be carried into said outlet pipe.

3. In a septic tank having inlet and outlet pipes adjacent the top thereof, said outlet pipe being slightly lower than the inlet pipe to maintain a water level below said inlet pipe, the combination of a closed water chamber in the lower area of the tank; a water circulating means extending into said chamber and rising above the chamber to a point above the water line and having an opening in the side thereof midway between said water line and the top of said chamber; a water outlet means extending into said chamber and rising above the chamber and being connected to said outlet pipe; and a member in the chamber extending from top to bottom thereof and from one end wall thereof to a point four-fifths of the distance across said chamber and being between said water circulating means and said water circulating outlet means.

4. In a septic tank having an inlet pipe adjacent the top thereof and an outlet pipe extending from the opposite side of the tank but slightly lower than said inlet pipe to maintain a water level below said inlet pipe, the combination of a closed water chamber in the lower area of said tank; a baffle plate in said chamber dividing said chamber into two sections sealed from each other at one end thereof and open at their opposite adjacent ends; an inlet conduit extending into one of the sections of said chamber and into the closed end thereof, said conduit extending above said chamber to a point above said water level and having an opening in the side thereof below said water level; and an outlet conduit extending into the other section of said chamber and into the closed end thereof, said outlet conduit also extending above said chamber and being connected to said outlet pipe.

5. In a septic tank having an upper water chamber and a lower water chamber; an inlet pipe adjacent the top of the upper chamber; an outlet pipe adjacent the top of the upper chamber but lower than the inlet pipe to determine the water level in the upper chamber; a conduit connecting the chambers to cause the water from an area below the water line in the upper chamber to flow downwardly into said lower chamber; baffle means in the lower chamber to direct the flow of water in the lower chamber to cause it to flow from one end thereof to the opposite end and around one end of said baffle means to the opposite end thereof; and a conduit to cause said circulated water to flow from an area midway the top and bottom of said lower chamber upwardly directly to said outlet pipe adjacent the top of said upper chamber.

6. In a septic tank having an upper water chamber and a lower water-purifying chamber; an inlet pipe adjacent the top of the upper chamber; an outlet pipe adjacent the top of the upper chamber but lower than said inlet pipe said outlet pipe governing the water level in the upper chamber; a separating plate in said lower chamber to divide the same into two sections separated at one end and joined at the opposite end; a conduit having an opening in the side thereof to cause the water in the upper chamber to flow from an area below the water line downwardly into one of said sections at the closed end thereof to cause the water to continue to circulate through said one section from the closed end to the open end thereof, around the end of said separating plate and through the other section of the lower chamber to the closed end of said other section; and a conduit connected to said outlet pipe adjacent the top of the upper chamber and extending into said closed end of said other chamber section to cause continued circulation of the water from the closed end of said other section to said outlet pipe.

7. In a septic tank, the combination of a chamber in the lower area of the tank; a dividing means in said chamber contacting the underside of the top of said chamber and the bottom of the chamber and also one end wall of the chamber, said means extending from said end wall substantially four-fifths of the distance between the end walls of the chamber to form an inlet section and an outlet section; an outlet conduit extending into the outlet section of said chamber at the closed end of said outlet section; and a water circulating member entering said inlet section of the chamber adjacent the closed end thereof said member extending upwardly above the level of the outlet, and having an opening in the side thereof below the level of the outlet.

8. In a septic tank, the combination of a chamber in the lower area of said tank said chamber being formed by a top plate sealed to the walls of said tank; a dividing plate in said chamber arranged to form an inlet section and an outlet section of said chamber, said plate also being arranged to cause the adjacent ends of the inlet and outlet sections to be completely separated from one another and to cause the opposite adjacent ends of said inlet and outlet sections to be open to allow water to flow from the closed end of the inlet chamber through the open end thereof into the open end of said outlet section; an outlet pipe leading away from the tank adjacent the top of the tank; a water circulating pipe entering said inlet section of the chamber adjacent the closed end thereof, said circulating pipe extending one-half way to the bottom of said inlet section and also extending upwardly above said top plate to a point near the top of the tank and above the level of the outlet pipe, said circulating pipe having an opening in the side thereof below the level of the outlet pipe to cause circulation of water down through said circulating pipe, through said inlet section of said chamber and through said outlet section of said chamber; and an outlet conduit extending into the closed end of the outlet section of the chamber to a point one-half way to the bottom of said chamber, said conduit extending upwardly to a point near the top of the tank and being connected to said outlet pipe whereby the water after circulating through said circulating means, through said inlet section of the chamber and through said outlet section of the chamber, is circulated up through said conduit to said outlet pipe leading away from said tank adjacent the top of the tank.

9. In a septic tank having an upper water chamber and a lower water chamber; an inlet pipe adjacent the top of the upper chamber; an outlet pipe adjacent the top of the upper chamber but lower than the inlet pipe; means including a closed chamber in the lower part of said septic tank; a dividing plate in said closed chamber to divide said closed chamber into two sections which sections are joined together at one end thereof; a conduit extending into said closed chamber and having an opening in the side thereof below said outlet pipe to cause the water from an area below the outlet pipe in the upper chamber to flow downwardly into the closed end of one of the sections of the closed chamber; and a second conduit extending into said closed chamber into the closed end of the other section of said closed chamber to cause the water, from an area midway the top and bottom of the closed end of the last mentioned section of the closed chamber, to flow upwardly directly to said outlet pipe adjacent the top of the upper chamber.

CHESTER C. ELLIOTT.

REFERENCES CITED

The following references are of record in the file of this patent:

UNITED STATES PATENTS

| Number | Name | Date |
|---|---|---|
| 924,285 | Smith | June 8, 1909 |
| 1,101,106 | Travis et al. | June 23, 1914 |
| 1,695,781 | Otis | Dec. 18, 1928 |
| 2,078,260 | Mallory | Apr. 27, 1937 |
| 2,195,408 | Downes | Apr. 2, 1940 |
| 2,440,762 | Sitton | May 4, 1948 |